United States Patent
Chen et al.

(10) Patent No.: US 9,560,358 B2
(45) Date of Patent: Jan. 31, 2017

(54) DEVICE AND METHOD FOR SCALABLE CODING OF VIDEO INFORMATION

(71) Applicant: QUALCOMM Incorporated, San Diego, CA (US)

(72) Inventors: Jianle Chen, San Diego, CA (US); Vadim Seregin, San Diego, CA (US); Xiang Li, San Diego, CA (US); Krishnakanth Rapaka, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 14/334,417

(22) Filed: Jul. 17, 2014

(65) Prior Publication Data
US 2015/0023419 A1    Jan. 22, 2015

Related U.S. Application Data

(60) Provisional application No. 61/857,165, filed on Jul. 22, 2013, provisional application No. 61/886,997, filed on Oct. 4, 2013.

(51) Int. Cl.
*H04N 19/105* (2014.01)
*H04N 19/70* (2014.01)
(Continued)

(52) U.S. Cl.
CPC .......... *H04N 19/105* (2014.11); *H04N 19/157* (2014.11); *H04N 19/174* (2014.11);
(Continued)

(58) Field of Classification Search
CPC ...... H04N 19/105; H04N 19/70; H04N 19/30; H04N 19/577
See application file for complete search history.

(56) References Cited

U.S. PATENT DOCUMENTS

2014/0064374 A1* 3/2014 Xiu .................. H04N 19/52
375/240.16

FOREIGN PATENT DOCUMENTS

WO    WO-2014107366    7/2014

OTHER PUBLICATIONS

Boyce J., et al., "High-level syntax modifications for SHVC", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/ No. JCTVC-M0046, Apr. 8, 2013 (Apr. 8, 2013), XP030114003; pp. 1-12.

(Continued)

*Primary Examiner* — Dave Czekaj
*Assistant Examiner* — Nam Pham
(74) *Attorney, Agent, or Firm* — Knobbe, Martens, Olson & Bear, LLP

(57) ABSTRACT

An apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to generate an inter-layer reference picture (ILRP) by upsampling the RL picture, the ILRP having a single slice associated therewith, set slice information of the single slice of the ILRP equal to slice information of the first slice, and use the ILRP to code at least a portion of the EL picture. The processor may encode or decode the video information.

15 Claims, 11 Drawing Sheets

(51) Int. Cl.
| | |
|---|---|
| *H04N 19/33* | (2014.01) |
| *H04N 19/30* | (2014.01) |
| *H04N 19/157* | (2014.01) |
| *H04N 19/174* | (2014.01) |
| *H04N 19/577* | (2014.01) |

(52) U.S. Cl.
CPC .............. *H04N 19/30* (2014.11); *H04N 19/33* (2014.11); *H04N 19/577* (2014.11); *H04N 19/70* (2014.11)

(56) References Cited

OTHER PUBLICATIONS

Chen J., et al., "Derivation of picture and slice level information for resampled interlayer reference picture", 14. JCT-VC Meeting; Jul. 25, 2013-Feb. 8, 2013; Vienna; (Joint Collaborative Team on Video Coding of ISO/IEC JTC1/SC29/WG11 and ITU-T SG.16); URL: http://wftp3.itu.int/av-arch/jctvc-site/ No. JCTVC-N0334, p. 1-6, Jul. 23, 2013 (Jul. 23, 2013), XP030114882.

Chen J., et al., "Derivation of picture and slice level information for resampled interlayer reference picture," Qualcomm Incorporated, Joint Collaborative Team on Video Coding (JCT-VC) of ITU-T SG 16 WP 3 and ISO/IEC JTC 1/SC 29/WG 11, JCTVC-N0344, 14th Meeting: Vienna, AT, Jul. 25-Aug. 2, 2013, 6 pages.

Chen J., et al., "SHVC Test Model 2", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/ No. JCTVC-M1007, Jun. 6, 2013 (Jun. 6, 2013),XP030114429.

Chen J., et al., "SHVC Working Draft 2", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16 ); URL: http://wftp3.itu.int/av-arch/jctvc-site/ No. JCTVC-M1008, XP030114430, May 21, 2013 (May 21, 2013), 51 pages.

Chen J., et al., "On slice level information derivation and motion field mapping for resampled interlayer reference picture", 15. JCT-VC Meeting, Oct. 23, 2013-Jan. 11, 2013, Geneva, (Joint SG.16 ), URL: http://wftp3.itu.int/av-arch/jctvc-site/ No. JCTVC-00216, Oct. 30, 2013 (Oct. 30, 2013), XP030115265; pp. 1-44.

Dong J., et al., "Description of scalable video coding technology proposal by InterDigital Communications", 11. JCT-VC Meeting; 102. MPEG Meeting; Oct. 10, 2012-Oct. 19, 2012; JTC1/SC29/WG11 and ITU-T SG.16 ); URL: http://wftp3.itu.int/av-arch/jctvc-site/ No. JCTVC-K0034, Oct. 1, 2012 (Oct. 1, 2012), XP030112966, pp. 1-28.

Hannuksela M.M., et al., "Test Model for Scalable Extensions of High Efficiency Video Coding (HEVC)," 103, MPEG Meeting; Jan. 21, 2013-Jan. 25, 2013; Geneva; (Motion Picture Expert Group or ISO/IEC JTC1/SC29/WG11, No. m28348, Jan. 22, 2013 (Jan. 22, 2013) XP030056894, pp. 1-49.

International Search Report and Written Opinion—PCT/US2014/047250—ISA/EPO—Jan. 8, 2015.

Kwon D-K., et al., "Inter-layer slice header syntax elements prediction in SHVC and MV-HEVC", 13. JCT-VC Meeting; 104. MPEG Meeting; Apr. 18, 2013-Apr. 26, 2013; Incheon; (Joint Collaborative Team on Video Coding of ISO/IEC JTC/SC29/WG11 and ITU-T SG.16); URL: http://wftp3.itu.int/av-arch/jctvc-site/ No. JCTVC-M0218, p. 1-5, Apr. 8, 2013 (Apr. 8, 2013), XP030114175.

Partial International Search Report—PCT/US2014/047250—ISA/EPO—Oct. 20, 2014.

Sato K., "AHG9: On PPS", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0174, Oct. 1, 2012 (Oct. 1, 2012), XP030113056.

Schwarz et al., "Overview of the Scalable Video Coding Extension of the H.264/AVC Standard", IEEE Transactions on Circuits and Systesm for Video Technology, Sep. 1, 2007, pp. 1103-1120, vol. 17, No. 9, IEEE Service Center, XP01119319, ISSN: 1051-8215, DOI: 10.1109/TCSVT.2007.905532.

Xiu X., et al., "On derivation of slice information and motion information for inter-layer reference picture in SHVC", 15. JCT-VC Meeting; Oct. 23, 2013-Jan. 11, 2013; Geneva; (Joint Collaborative Team On Video Coding of ISO/IEC JTC1/SC29/WG11 and ITU-T SG.16); URL: http://wftp3.itu.int/av-arch/jctvc-site/ No. JCTVC-00168, Oct. 14, 2013 (Oct. 14, 2013), XP030115195; pp. 1-8.

* cited by examiner

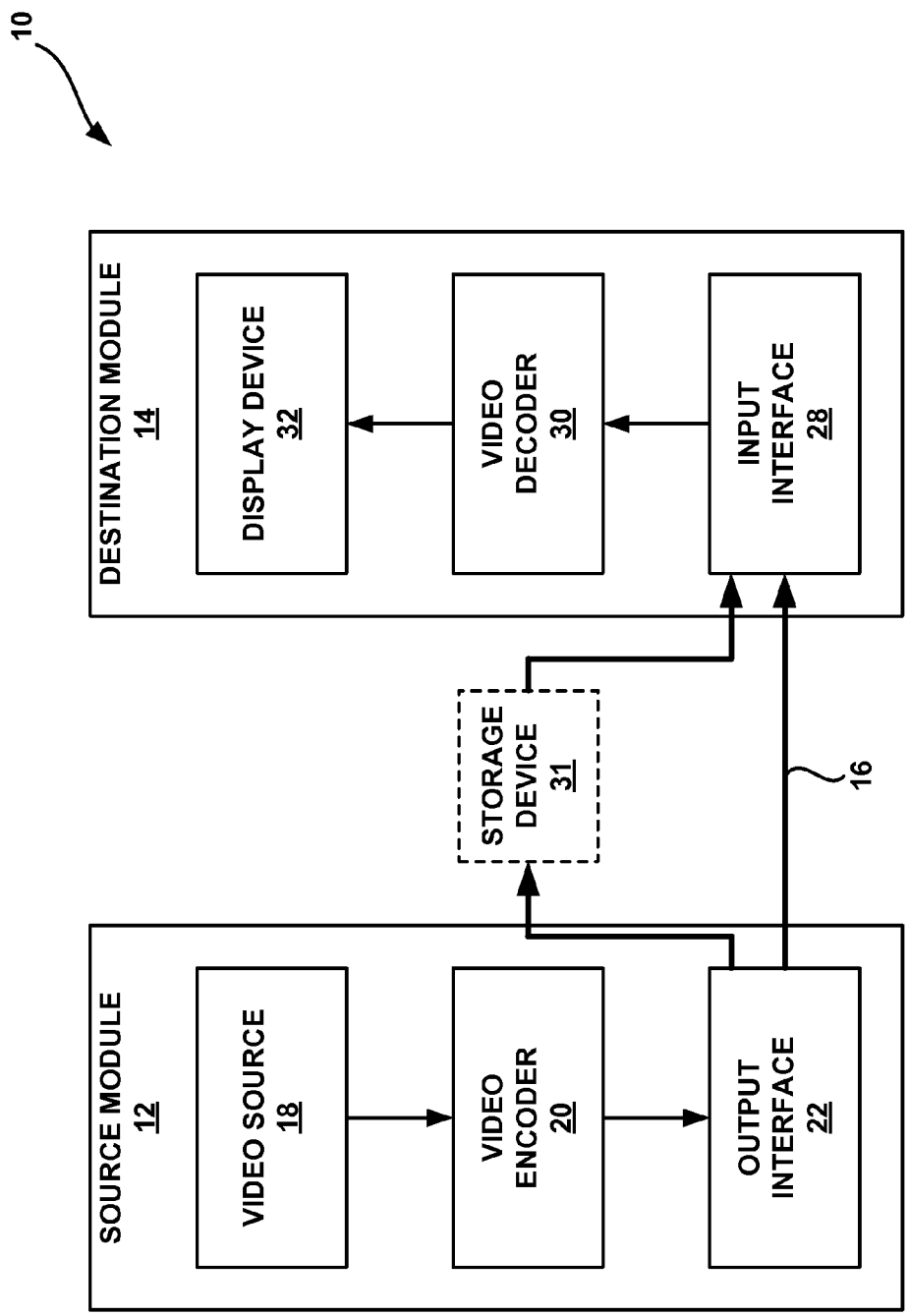

DEVICE AND METHOD FOR SCALABLE CODING OF VIDEO INFORMATION

CROSS-REFERENCE TO RELATED APPLICATIONS

This application claims priority to U.S. Provisional No. 61/857,165, filed Jul. 22, 2013, and U.S. Provisional No. 61/886,997, filed Oct. 4, 2013.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multi-view or 3D extension of the HEVC standard, there may be multiple views, and information of one view may be utilized to code (e.g., encode or decode) the information of another view (e.g., motion estimation, motion vector prediction and/or other redundancies).

In SVC, a current block in the enhancement layer may be coded (e.g., encoded or decoded) using the information derived from a reference layer. For example, a current block in the enhancement layer may be coded using the information (e.g., texture information or motion information) of a co-located block in the reference layer (the term "co-located" as used in the present disclosure may refer to a block in another layer that corresponds to the same image as the current block, e.g., the block that is currently being coded). However, for certain scalability schemes such as spatial scalability, the reference layer information may need to be modified before being used to code the enhancement layer. For example, the reference layer information may need to be resampled (e.g., according to the resolution ratio between the reference layer and the enhancement layer) before being used to code the enhancement layer. For example, in some implementations, a reference layer picture may be resampled and inserted into the reference picture list of an enhancement layer picture and used for coding the enhancement layer picture.

However, the resampling of the reference layer picture may cause the resulting resampled picture to violate one or more bitstream conformance constraints. For example, the reference layer picture may be divided into multiple slices, and some implementations may dictate that the slice boundary coincide with the largest coding unit (LCU) boundaries. However, after the reference layer picture is resampled, the slice boundary of the reference layer picture may no longer coincide with the LCU boundaries. In such a case, a modification of the slice boundary in the resampled reference layer picture may be desired, at the cost of additional processing and computing power.

Thus, by using a simpler method for upsampling reference layer pictures that will generate pictures that comply with bitstream conformance constraints, computational complexity may be reduced.

The systems, methods and devices of this disclosure each have several innovative aspects, no single one of which is solely responsible for the desirable attributes disclosed herein.

In one aspect, an apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to: generate an inter-layer reference picture (ILRP) by upsampling the RL picture, the ILRP having a single slice associated therewith; set slice information of the single slice of the ILRP equal to slice information of the first slice; and use the ILRP to code at least a portion of the EL picture. The processor may encode or decode the video information.

In one aspect, a method of coding (e.g., encoding or decoding) video information comprises generating an inter-layer reference picture (ILRP) by upsampling a reference layer (RL) picture in a reference layer having a first slice and a second slice, the ILRP having a single slice associated therewith; setting slice information of the single slice of the ILRP equal to slice information of the first slice; and using the ILRP to code at least a portion of an enhancement layer (EL) picture in an enhancement layer.

In one aspect, a non-transitory computer readable medium comprises code that, when executed, causes an apparatus to perform a process. The process includes storing video information associated with a reference layer and an enhancement layer, the reference layer comprising a reference layer (RL) picture having a first slice and a second slice, and the enhancement layer comprising an enhancement layer (EL) picture corresponding to the RL picture; generating an inter-layer reference picture (ILRP) by upsampling the RL picture, the ILRP having a single slice associated therewith; setting slice information of the single slice of the ILRP equal to slice information of the first slice; and using the ILRP to code at least a portion of the EL picture.

In one aspect, a video coding device configured to code video information comprises means for storing video information associated with a reference layer and an enhancement layer, the reference layer comprising a reference layer (RL) picture having a first slice and a second slice, and the enhancement layer comprising an enhancement layer (EL) picture corresponding to the RL picture; means for generating an inter-layer reference picture (ILRP) by upsampling the RL picture, the ILRP having a single slice associated therewith; means for setting slice information of the single slice of the ILRP equal to slice information of the first slice; and means for using the ILRP to code at least a portion of the EL picture.

In one aspect, an apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to: determine whether first slice information of the first slice and second slice information of the second slice are identical; and in response to determining that the first slice information and the second slice information are identical, enable inter-layer motion prediction for coding at least a portion of the EL picture.

In one aspect, a method of coding (e.g., encoding or decoding) video information comprises determining whether first slice information of a first slice of a reference layer (RL) picture and second slice information of a second slice of the RL picture are identical; and in response to determining that the first slice information and the second slice information are identical, enabling inter-layer motion prediction for coding at least a portion of an enhancement layer (EL) picture.

In one aspect, an apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to: determine whether first slice information of the first slice and second slice information of the second slice are identical; and in response to determining that the first slice information and the second slice information are not identical, disable inter-layer motion prediction for coding the EL picture.

In one aspect, a method of coding (e.g., encoding or decoding) video information comprises determining whether first slice information of a first slice of a reference layer (RL) picture and second slice information of a second slice of the RL picture are identical; and in response to determining that the first slice information and the second slice information are not identical, disabling inter-layer motion prediction for coding an enhancement layer (EL) picture corresponding to the RL picture.

In one aspect, an apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to: generate an inter-layer reference picture (ILRP) by upsampling the RL picture, the ILRP having a single slice associated therewith; and determine whether a slice type of the first slice and a slice type of the second slice are different. The processor, in response to determining that the slice type of the first slice and the slice type of the second slice are different, may be further configured to: set a slice type of the single slice of the ILRP to be equal to B-slice if at least one of the first and second slices is a B-slice; set the slice type of the single slice of the ILRP to be equal to P-slice if at least one of the first and second slices is a P-slice and none of the first and second slices is a B-slice; and set the slice type of the single slice of the ILRP to be equal to I-slice if the first and second slices are both I-slices.

In one aspect, a method of coding (e.g., encoding or decoding) video information comprises generating an inter-layer reference picture (ILRP) by upsampling a reference layer (RL) picture in a reference layer having a first slice and a second slice, the ILRP having a single slice associated therewith; and determining whether a slice type of the first slice and a slice type of the second slice are different. Further, the method, in response to determining that the slice type of the first slice and the slice type of the second slice are different, may further comprise: setting a slice type of the single slice of the ILRP to be equal to B-slice if at least one of the first and second slices is a B-slice; setting the slice type of the single slice of the ILRP to be equal to P-slice if at least one of the first and second slices is a P-slice and none of the first and second slices is a B-slice; and setting the slice type of the single slice of the ILRP to be equal to I-slice if the first and second slices are both I-slices.

In one aspect, an apparatus configured to code video information includes a memory and a processor in communication with the memory. The memory is configured to store video information associated with a reference layer and an enhancement layer, the reference layer comprising a reference layer (RL) picture having a first slice and a second slice, and the enhancement layer comprising an enhancement layer (EL) picture corresponding to the RL picture. The processor is configured to: generate an inter-layer reference picture (ILRP) by upsampling the RL picture, the ILRP having a single slice associated therewith; set slice information of the single slice of the ILRP equal to slice information of the first slice; modify motion information associated with a portion of the ILRP corresponding to the second slice of the RL picture to correct inaccuracies therein; and use the ILRP to code at least a portion of the EL picture.

In one aspect, a method of coding (e.g., encoding or decoding) video information comprises generating an inter-layer reference picture (ILRP) by upsampling a reference layer (RL) picture in a reference layer having a first slice and a second slice, the ILRP having a single slice associated therewith; setting slice information of the single slice of the ILRP equal to slice information of the first slice; modifying motion information associated with a portion of the ILRP corresponding to the second slice of the RL picture to correct inaccuracies therein; and using the ILRP to code at least a portion of the EL picture.

BRIEF DESCRIPTION OF DRAWINGS

FIG. 1A is a block diagram illustrating an example video encoding and decoding system that may utilize techniques in accordance with aspects described in this disclosure.

DETAILED DESCRIPTION

Figure 1B:
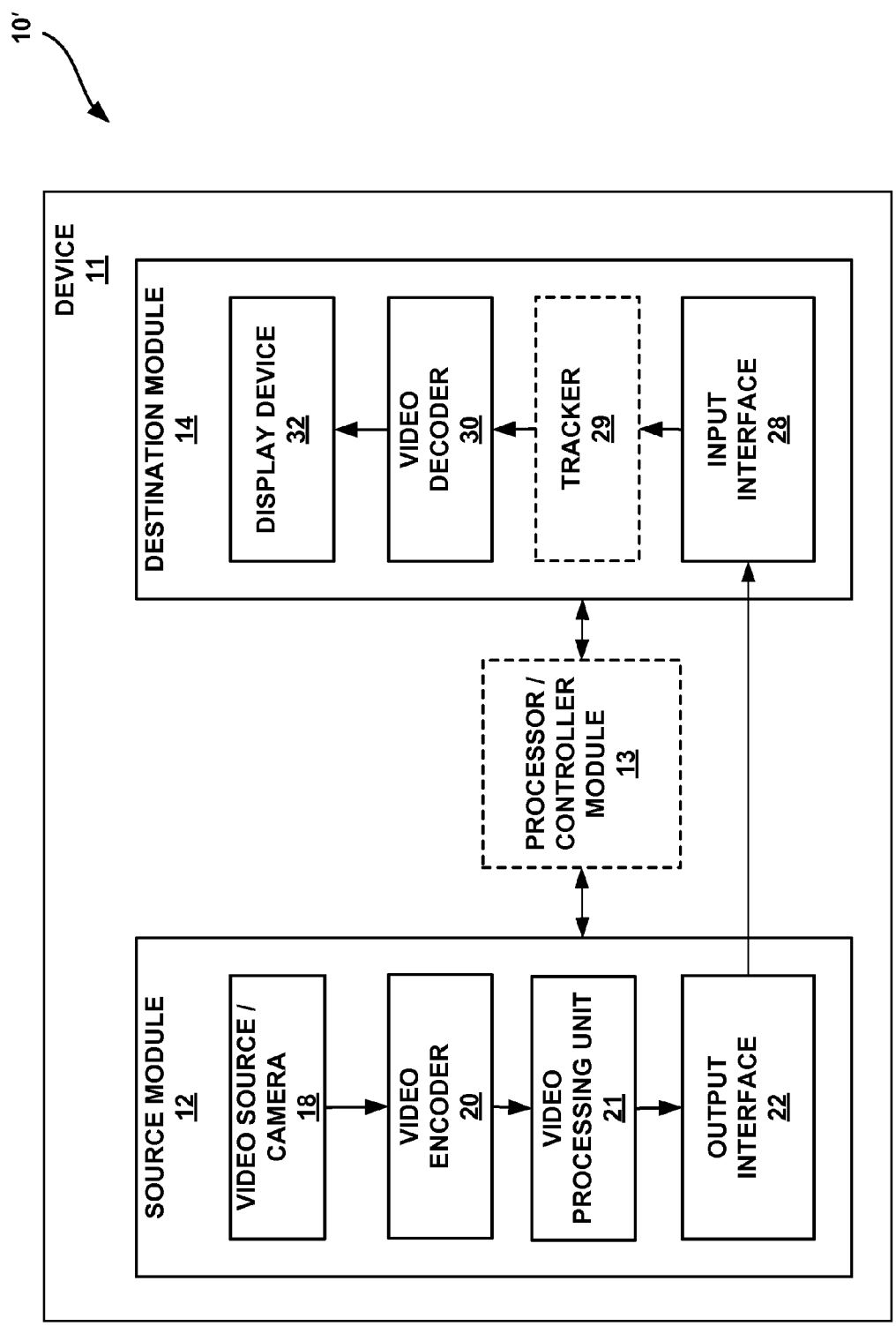
FIG. 1B is a block diagram illustrating another example video encoding and decoding system that may perform techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., a lower layer such as the base layer, and a higher layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1A, video coding system 10 includes a source module 12 that generates encoded video data to be decoded at a later time by a destination module 14. In the example of FIG. 1A, the source module 12 and destination module 14 are on separate devices—specifically, the source module 12 is part of a source device, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by an input interface 28. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback.

In the example of FIG. 1A, the destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
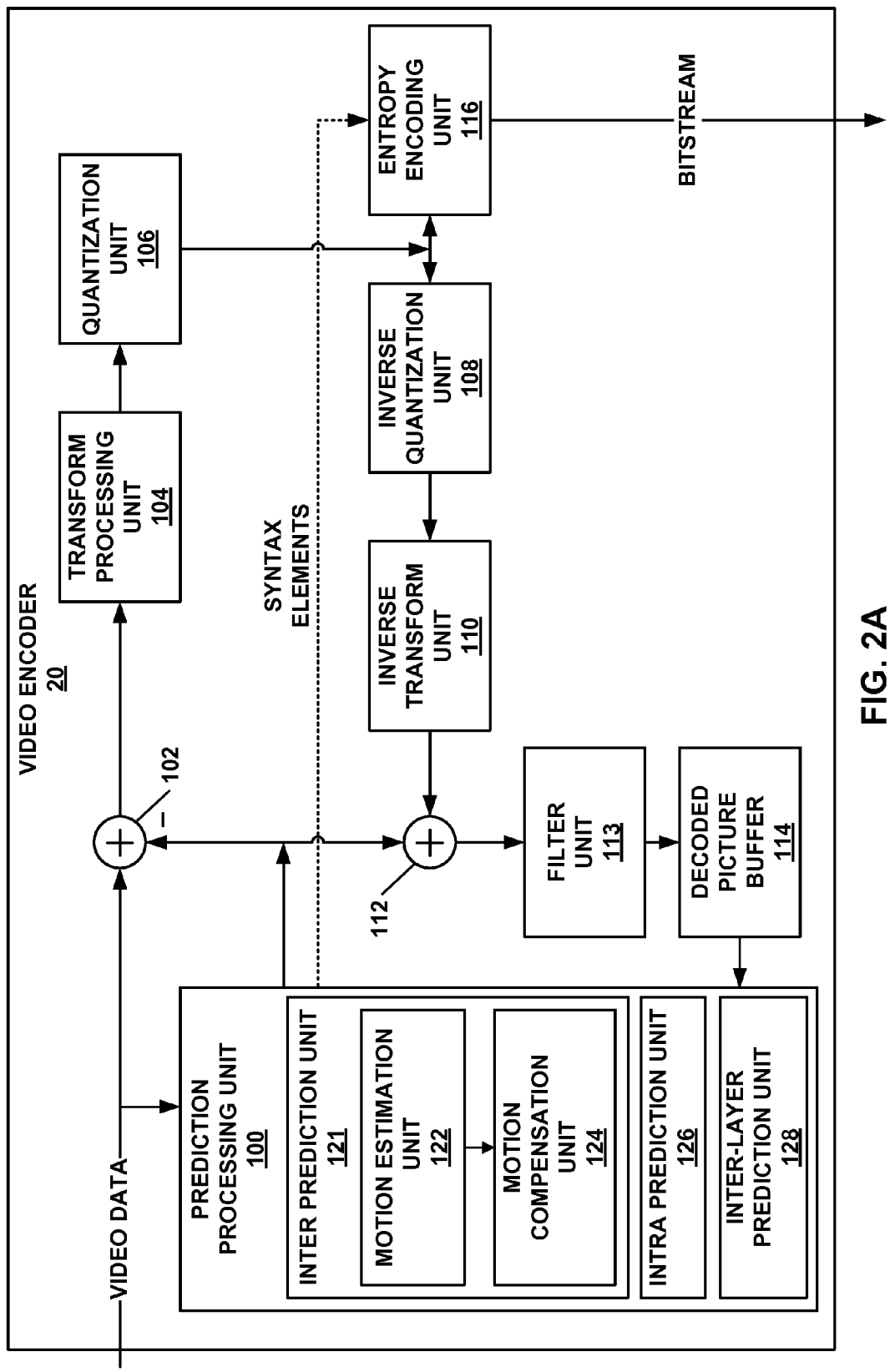
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 5-8, the prediction processing unit 100 may be configured to code (e.g., encode or decode) the PU (or any other reference layer and/or enhancement layer blocks or video units) by performing the methods illustrated in FIGS. 5-8. For example, inter prediction unit 121 (e.g., via motion estimation unit 122 and/or motion compensation unit 124), intra prediction unit 126, or inter-layer prediction unit 128 may be configured to perform the methods illustrated in FIGS. 5-8, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways.

For example, it is probable the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
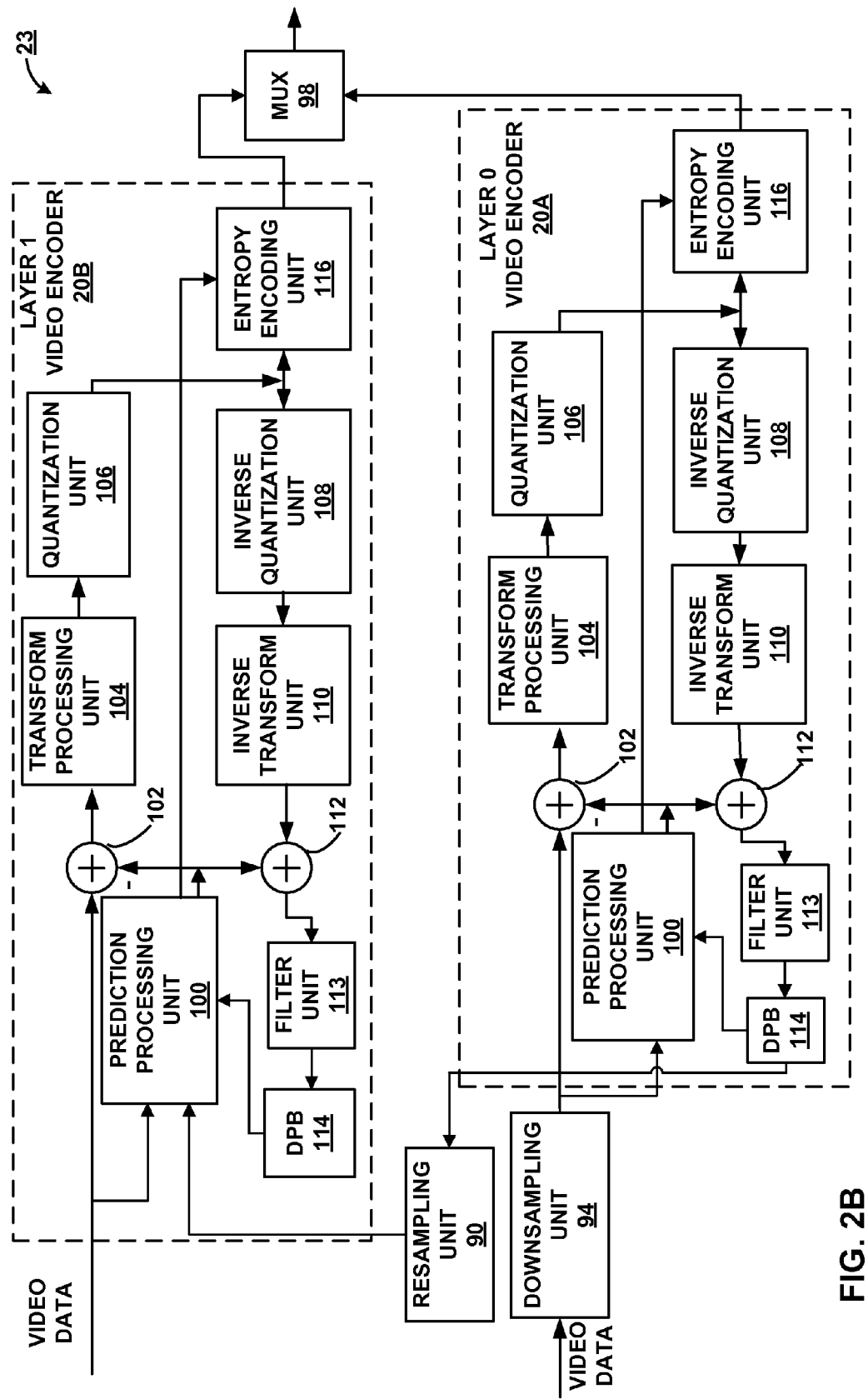
FIG. 2B is a block diagram illustrating an example of a video encoder that may implement techniques in accordance with aspects described in this disclosure.

FIG. 2B is a block diagram illustrating an example of a multi-layer video encoder 23 that may implement techniques in accordance with aspects described in this disclosure. The video encoder 23 may be configured to process multi-layer video frames, such as for SHVC and multiview coding. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor 98, or mux. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source module 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
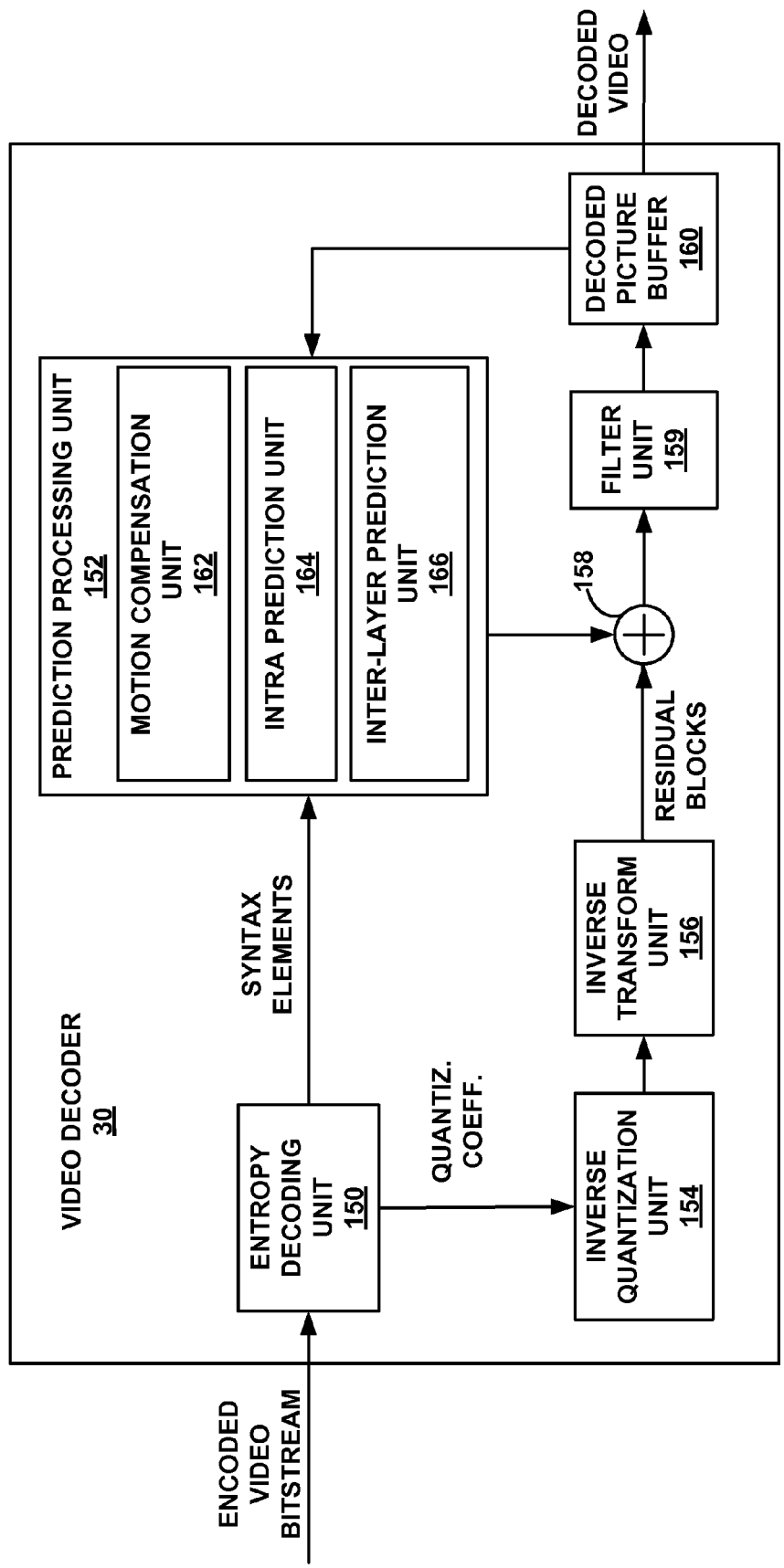
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 5-8, the prediction processing unit 152 may code (e.g., encode or decode) the PU (or any other reference layer and/or enhancement layer blocks or video units) by performing the methods illustrated in FIGS. 5-8. For example, motion compensation unit 162, intra prediction unit 164, or inter-layer prediction unit 166 may be configured to perform the methods illustrated in FIGS. 5-8, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
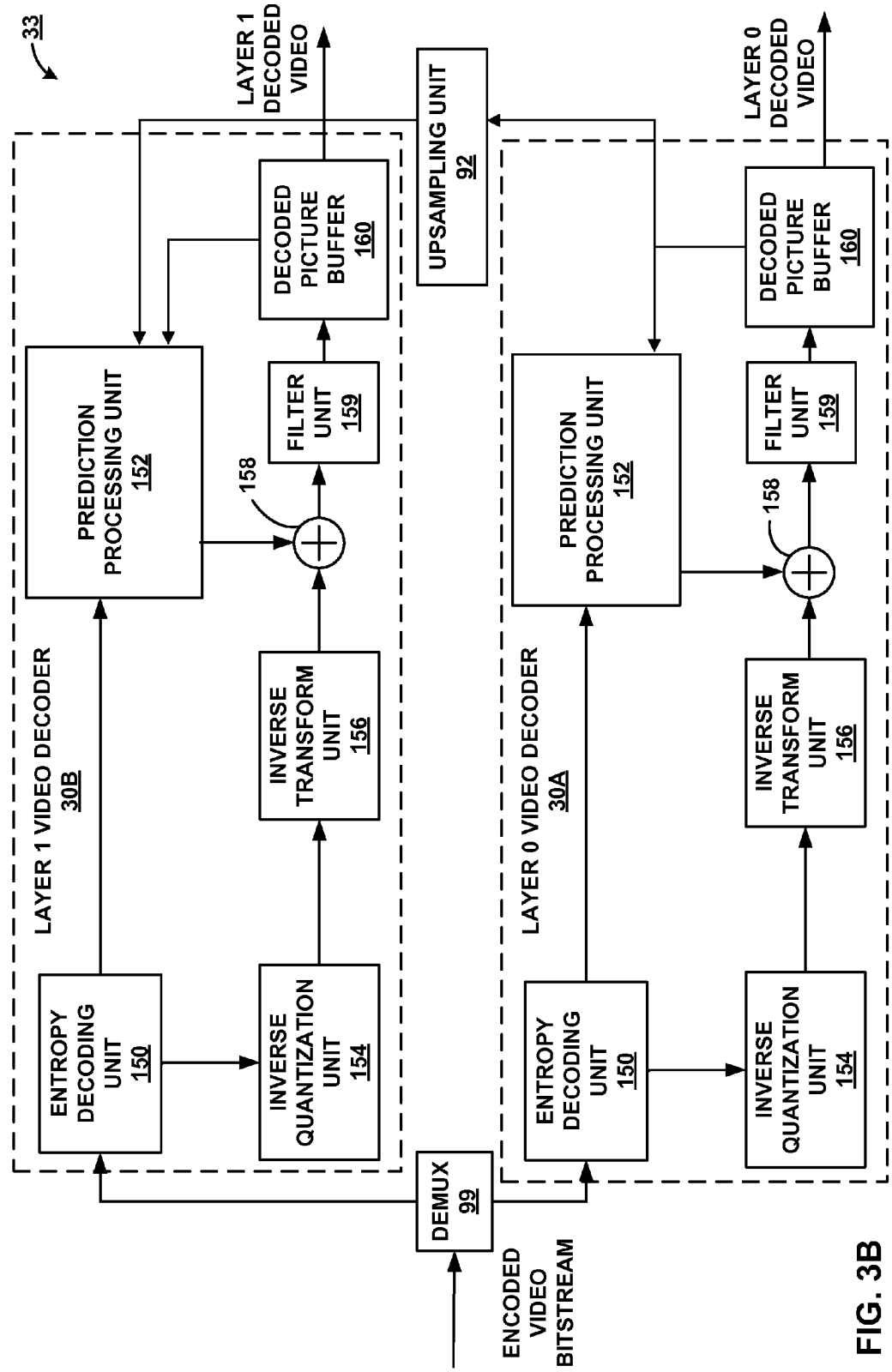
FIG. 3B is a block diagram illustrating an example of a video decoder that may implement techniques in accordance with aspects described in this disclosure.

FIG. 3B is a block diagram illustrating an example of a multi-layer video decoder 33 that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination module 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

HLS-Only HEVC-Based Scalable Video Coding

In some implementations (e.g., the scalable extension to HEVC), high-level syntax (HLS)-only video coding may be desired. For example, HLS-only video coding may mean that no block-level or coding unit-level changes are introduced in such implementations. Coding modes such as IntraBL cannot be used in connection with such implementations because such coding modes may involve block-level changes to the HEVC framework. For example, IntraBL involves directly accessing the texture information of the block in a reference layer that is co-located with respect to the current block in the enhancement layer that is being coded.

However, HLS-only video coding may be achieved by taking the reference layer picture (e.g., after any applicable processing such as resampling) and inserting it into the reference picture list of the enhancement layer picture. In this case, the reference picture inserted into the reference picture list can simply be treated as another picture in the enhancement layer and can be used for inter prediction, without requiring any block-level changes to the HEVC framework. If the reference layer and the enhancement layer have the same spatial resolution, an approach described in "MV-HEVC Working Draft 4(JCT3V-D1004)" may be used, which is available at http://phenix.it-sudparis.eu/jct2/doc_end_user/documents/4_Incheon/wg11/JCT3V-D1004-v3.zip. In such an approach, the picture inserted into the reference picture list of the enhancement layer can be used as the co-located picture (e.g., the picture in the same layer from which motion information is derived) for TMVP derivation without additional block-level processing.

Inter Prediction and TMVP

In inter prediction, a current block in an enhancement layer (EL) picture may be predicted using the motion information of a temporally neighboring picture in the same layer. For example, a temporal motion vector predictor (TMVP) can be derived from a co-located block (e.g., a block located at the same position in the temporally neighboring picture as the current block is in the current picture) in a co-located picture (e.g., the temporally neighboring picture in the same layer) and added to the motion vector (MV) candidate list of the current block in the EL.

The use of TMVPs may improve coding efficiency. For example, a TMVP may be used as a predictor for the motion vector of the block currently being coded (e.g., current block), and a motion vector difference (MVD) between the motion vector of the current block and the TMVP may be coded instead of coding the entire motion vector of the current block.

Spatial Scalability

In a spatial scalability case, the EL picture has a different spatial resolution than the reference layer (RL) picture. For example, the spatial aspect ratio between EL and RL may be 1.5, 2.0, or other ratios. In this case, RL picture may be resampled such that the resampled RL picture matches the spatial resolution of the EL picture before inserting the resampled RL picture into the EL reference lists as described in "SHVC Working Draft 2," which is available at http://phenix.int-evry.fr/jct/doc_end_user/documents/13_Incheon/wg11/JCTVC-M1008-v3.zip.

In order to enable both texture prediction and motion prediction, both pixel and non-pixel information (syntax, modes and mode parameters) associated with the RL picture may be resampled. For example, prediction mode and motion information such as motion vectors, reference indices, inter directions can be resampled, so that the use of TMVPs may be allowed. In addition to the block-level information mentioned above, the TMVP derivation process may also use high-level information of the co-located picture (e.g., resampled RL picture inserted in the reference picture list of the EL), such as picture type and reference picture list information thereof.

Generating an Inter-Layer Reference Picture (ILRP)

Figure 4B:
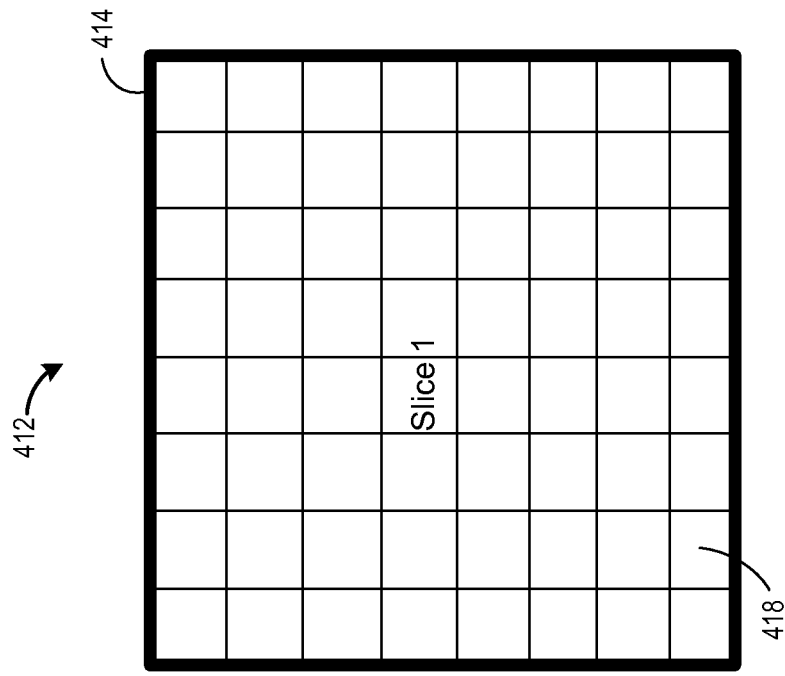
FIGS. 4A and 4B illustrate an example method of generating an inter-layer reference picture, according to one embodiment of the present disclosure.
Figure 4A:
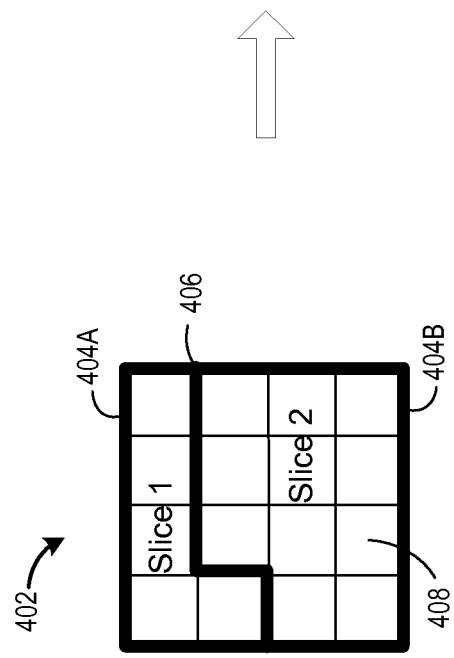

FIGS. 4A and 4B illustrate an example method of generating an inter-layer reference picture using a reference layer picture. As discussed above, in some implementations, the generated inter-layer reference picture is added to the reference picture list of the enhancement layer and used for coding the enhancement layer picture. FIG. 4A illustrates a reference layer picture 402, which includes a number of slices 404A and 404B. Although only two slices are shown in the example of FIG. 4A, the number of slices is not limited as such, and can be any arbitrary number. As illustrated in FIG. 4A, the division between the two slices 404A and 404B is identified by slice border 406. The slice border 406 is distinguished from the grid lines dividing the reference layer picture 402 into coding units by the increased thickness of the slice border 406 compared to the grid lines.

Each of the slices may be associated with slice-specific information and/or syntax information specific to the slice. This slice information may be included in a slice header for each slice 404A and 404B or may be stored elsewhere and associated with the slice, such as via a mapping table or other data structure. The slice information may include any type of information that can be associated with a slice, such as picture order count (POC) value, color plane, address of the first coding tree block in the slice, reference picture list information, etc. This slice information may be defined by the HEVC standard. However, the slice information is not limited as such and may include other standards-based information and/or application-specific information, which may or may not be associated with a particular standard.

The reference layer picture 402 may be divided into a number of coding units 408 or coding tree blocks (CTBs) as indicated by the grid lines. The coding units may be of varying pixel sizes. For example, the coding units may be 16×16 pixels or 64×64 pixels. In some cases, the coding units may be referred to as largest coding units (LCUs). The slices 404A and 404B may include a number of LCUs. In the depicted example, the slice 404A includes 5 LCUs and the slice 404B includes 11 LCUs. Although each block or CTB of the reference layer picture 402 is depicted as being equivalently sized, in some embodiments, CTBs may of the layer 402 may vary in size. Although the reference layer picture 402 is illustrated in FIG. 4A, the reference layer picture 402 may be any base layer picture or a picture from any other layer.

FIG. 4B illustrates a resampled reference layer picture 412, which is an resampled version of the reference layer picture 402. The resampled reference layer picture 412 may also be referred to as an inter-layer reference picture 412. The resampled reference layer picture 412 may represent a picture that can be included in the reference picture list of the enhancement layer (or any other layer having a higher resolution than the reference layer). This resampled reference layer picture 412 may, in some cases, be used to code (e.g., encode or decode) an enhancement layer picture. As illustrated in FIG. 4B, the resampled reference layer picture 412 represents an upsampling of the reference layer picture 402 by 2×, or a dyadic upsampling. In the example of FIG. 4B, the resampled reference layer picture 412 comprises coding units 418 having the same size as those of the reference layer picture 402, but the resampled reference layer picture 412 comprises four times as many coding units 418 as the reference layer picture 402. In other embodiments, upsampling may include scaling. For example, each coding unit within the resampled reference layer picture 412 can be 2× as long and 2× as wide as each coding unit in the reference layer picture 402 when 2× upsampling is applied. In other cases, each coding unit of the resampled reference layer picture 412 may be the same size as the coding units in the reference layer picture 402. In some cases, the upsampling is restricted to a specific scale, such as an integer scale (e.g., 2×, 3×, 5×, etc.). In other cases, the upsampling may be unrestricted and may include non-integer based upsampling (e.g., 1.5×, 3.3×, etc.). Further, although embodiments herein are primarily described using upsampling, some embodiments may include downsampling (e.g., 0.5×).

As illustrated in FIG. 4B, the resampled reference layer picture 412 includes a single slice 414. As discussed herein, the slice information of the slice 414 may be derived from slice 404A, slice 404B, or both. In one embodiment, the process of "deriving" slice information from another slice comprises copying over the slice information of that slice. For example, the slice 414 may have the same slice information as the slice 404A. In another example, the slice 414 may have the same slice information as the slice 404B. In yet another example, the slice 404 may have some information derived from the slice 404A and other information derived from the slice 404B. Since the resampled reference layer picture 412 has one slice 414, there is no slice border illustrated in FIG. 4B. As discussed above, because the resampled reference layer picture 412 has one slice and no slice border, the need to perform additional processing to ensure bitstream conformance of multiple slices (e.g., raster scan order processing) is eliminated.

Data Included in Inter-Layer Reference Picture

For example, in some embodiments, generating an inter-layer reference picture (e.g., a reference picture generated based on a RL picture, which is used for inter prediction of the EL) that does not involve low-level (e.g., block-level) process changes in the HLS-only HEVC-SVC in the spatial scalability case: (A) upsample YUV data of the RL picture; (B) upsample motion parameters (e.g., motion vectors and reference indices) of the RL picture; and (C) derive high-level (e.g., picture or slice level) information of the RL picture. For example, the generated inter-layer reference picture (ILRP) may include the following data that are derived from the RL picture: (A) upsampled texture picture having the same spatial resolution as the EL picture; (B) motion parameters for each basic unit (e.g., coding unit or prediction unit); and (C) high-level (e.g., picture or slice level) information.

The high-level information (e.g., item (C) above) of the generated inter-layer reference picture may include picture POC value, slice partition pattern, slice types, reference picture list information, and any other high-level information that may be used in the TMVP derivation process. The reference picture list information may include reference picture number in each reference picture list, reference picture type (e.g., short-term or long-term) of all reference pictures, reference picture POC values of all reference pictures. In some implementations, the reference picture list information may include any of (1) the number of reference pictures in reference picture list 0, (2) the reference picture corresponding to each reference picture index of reference picture list 0 (e.g., the reference picture associated with a reference index of 0, the reference picture associated with a reference index of 1, etc.), (3) the number of reference pictures in reference picture list 1, and/or (4) the reference picture corresponding to each reference picture index of reference picture list 1. Some high-level information of the generated inter-layer reference picture may be simply copied over from that of the RL picture. Alternatively, some high-level information of the generated inter-layer reference picture may be set to a pre-fined value. For the picture-level information such as picture POC value can be directly copied from the related BL picture. However, some other information, such as slice type and reference list picture information, is associated with individual slices (e.g., each slice contains its own slice type and reference picture list). Such information of the generated inter-layer reference picture would need to be derived at the slice level.

In some implementations, modifying the slice boundary and/or the slice definition of the resampled RL picture when generating the high-level information of the inter-layer reference picture in multiple slices case is done based on the slice segmentation in the corresponding RL picture. For example, depending on how the corresponding RL picture is divided into multiple slices and where the slice boundaries are located, it is in some case desirable to modify the slice boundaries of the resampled RL picture so that the resulting resampled RL picture conforms to the standards and constraints that may apply.

In the case of MV-HEVC (multiview) or signal-to-noise ratio (SNR) scalable SVC, the slice information of the generated reference picture may be copied directly from the corresponding reference layer or reference view picture since the generated reference picture can have the same slice pattern with base-layer/base-view picture (e.g., if spatial resampling is not performed). On the other hand, in the case of spatial scalability, slice partition pattern derivation can be done by first resampling the slice partition pattern of the corresponding RL picture, and then adjusting the slice partition pattern so that the resulting reference picture conforms to any applicable standards or constraints (e.g., HEVC slice partition rules, such as slices having to contain a set of continuous LCUs in raster scan order).

Single-Slice ILRP

In some embodiments, when a reference layer picture is resampled based on the scalability ratio to generate an inter-layer reference picture, a single slice is generated for the resampled reference layer picture even if the reference layer picture has multiple slices defined therein. For example, all the coding tree blocks (CTBs) in the resampled reference layer picture are associated with the single slice. The slice information of the single slice of the resampled reference layer picture is generated using the slice information of one or more slices of the reference layer picture. For example, the slice information of the single slice of the resampled reference layer picture is set equal to the slice information of one of the slices of the reference layer picture. In one embodiment, the slice information includes a slice type and a reference picture list. However, the slice information is not limited to those described herein but may include any parameters or variables that may be signaled or received at the slice level (e.g., in the slice header).

Slices Having Different Reference Picture Lists

If a reference layer picture has multiple slices (e.g., slice #1 and slice #2) and they have different reference picture lists, there may be a problem. For example, if the reference layer picture is resampled and a single slice is generated for the resampled reference layer picture, and the slice information of the single slice is generated based on the slice information of slice #1 of the reference layer picture, blocks in the resampled reference layer picture that correspond to slice #2 of the reference layer picture may have reference index (e.g., a value that is used to identify a picture in the reference picture list) that is no longer valid because the reference picture list of the single slice of the resampled reference layer picture is different from the reference picture list of slice #2 of the reference layer picture. In this example, the reference picture list of the resampled reference layer picture would be the same as that of slice #1 of the reference layer picture, which is different from the reference picture list of slice #2.

In one example, slice #1 has three reference pictures and slice #2 has five reference pictures, and the slice information of the single slice of the resampled reference layer picture is derived from the slice information of slice #1 (e.g., reference picture list of the single slice is the same as the reference picture list of slice #1). However, some blocks of the resampled reference layer picture that correspond to slice #2 may have reference index values of 3 or 4, even though the reference picture list of the single slice has three reference pictures.

As described above, the process of generating or deriving the high-level information of the generated inter-layer reference picture (e.g., the slice partition pattern and other information associated with each slice) can be quite complex. Various embodiments of the present application may provide a simplified process for generating or deriving slice-level information (e.g., by refraining from generating multiple slices for the resampled inter-layer reference picture or generating a single slice for the resampled inter-layer reference picture).

Approach #1: Restricting Inter-Layer Motion Prediction

One solution to the problem that arises when the slices of the reference layer picture have different slice information (e.g., reference picture list) is to restrict inter-layer motion prediction to the case where the multiple slices of the reference layer picture have identical reference picture lists. For example, when a resampled reference layer picture is used as the co-located picture for TMVP derivation, inter-layer motion prediction is disabled unless all slices in the reference layer picture have identical reference picture list 0 and identical reference picture 1. Additionally, this restriction may also be applied to signal-to-noise ratio (SNR) scalability cases, or specifically to the case of SNR scalability with different CTB sizes in the enhancement layer and the reference layer, as described later in the application.

Figure 5:
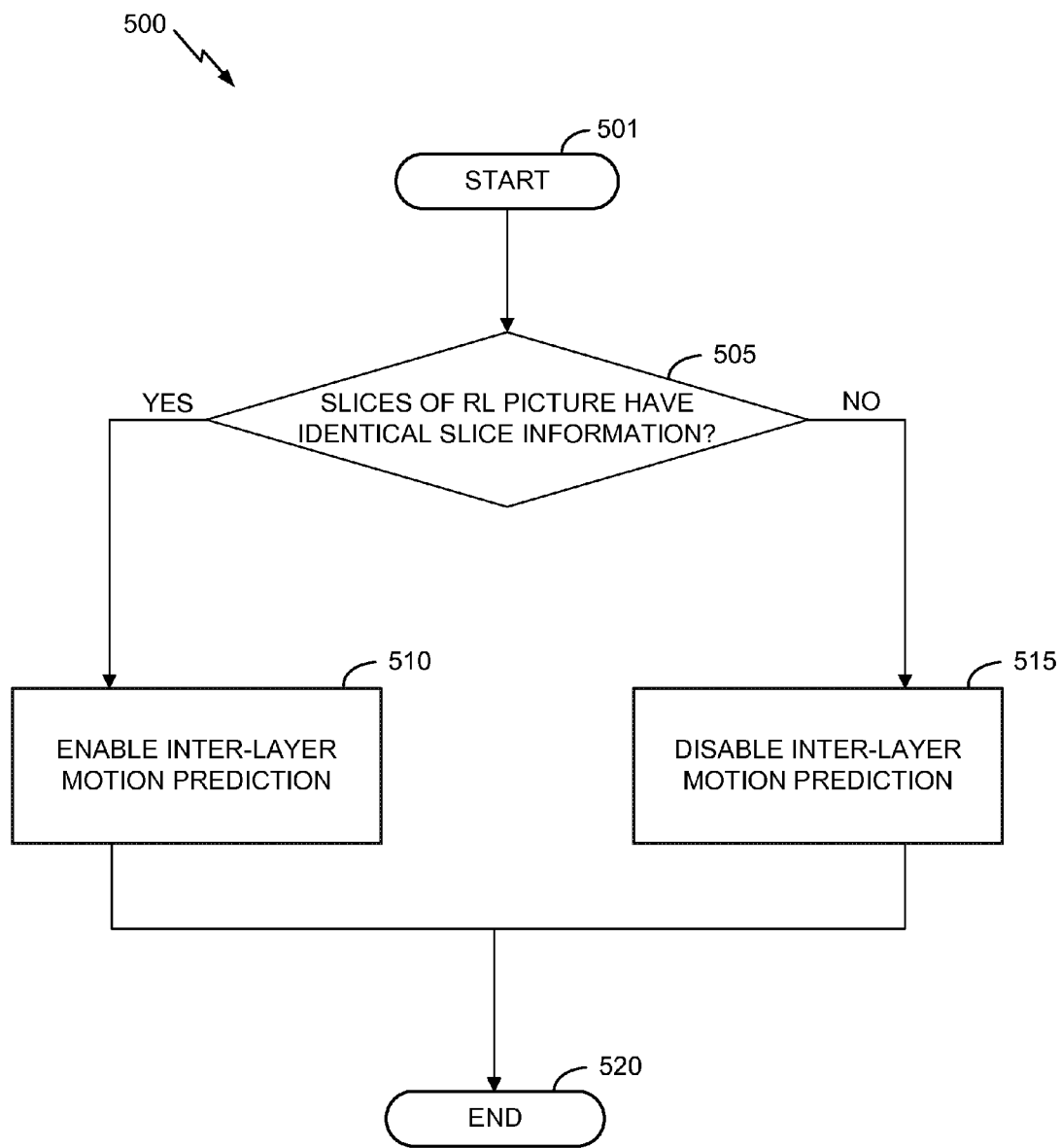
FIG. 5 illustrates a flow chart illustrating a method of coding video information, according to one embodiment of the present disclosure.

FIG. 5 is a flowchart illustrating a method 500 for coding video information, according to an embodiment of the present disclosure. The steps illustrated in FIG. 5 may be performed by an encoder (e.g., the video encoder as shown in FIG. 2A or FIG. 2B) or another component described herein. For convenience, method 500 is described as performed by a coder, which may be, for example, a video encoder.

The method 500 begins at block 501. In block 505, the coder determines whether the slices of the reference layer picture have identical slice information. In one embodiment, the slice information includes the reference picture list associated with the corresponding slice. If the coder determines that the slices of the reference layer picture have identical slice information, the coder enables inter-layer motion prediction in block 510. For example, the term "enabling" can mean, in addition to its original meaning, allowing inter-layer motion prediction to be considered by the coder as one of coding options for coding the current block or the current picture. In another example, the term "enabling" can mean merely refraining from restricting (or disabling) the use of inter-layer motion prediction and does not necessarily mean that the current block or the current picture is coded using inter-layer motion prediction. It may simply mean that if the coder determines that inter-layer motion prediction is the desired method of coding the current block or the current picture, it may do so.

On the other hand, if the coder determines that the slices of the reference layer picture have identical slice information, the coder disables inter-layer motion prediction in block 515. By restricting inter-layer motion prediction to those situations in which the slices of the reference layer picture have identical slice information (e.g., slice type, reference picture list, etc.), the generation of single-slice inter-layer reference pictures can be implemented more smoothly and the computational complexity associated with managing multiple slices in inter-layer reference pictures can be reduced or eliminated. The method 500 ends at block 520.

As discussed above, one or more components of video encoder 20 of FIG. 2A or video encoder 23 of FIG. 2B (e.g., inter-layer prediction unit 128) may be used to implement any of the techniques discussed in the present disclosure, such as determining whether the slices of the reference layer picture have identical slice information and enabling/disabling inter-layer motion prediction.

Figure 6:
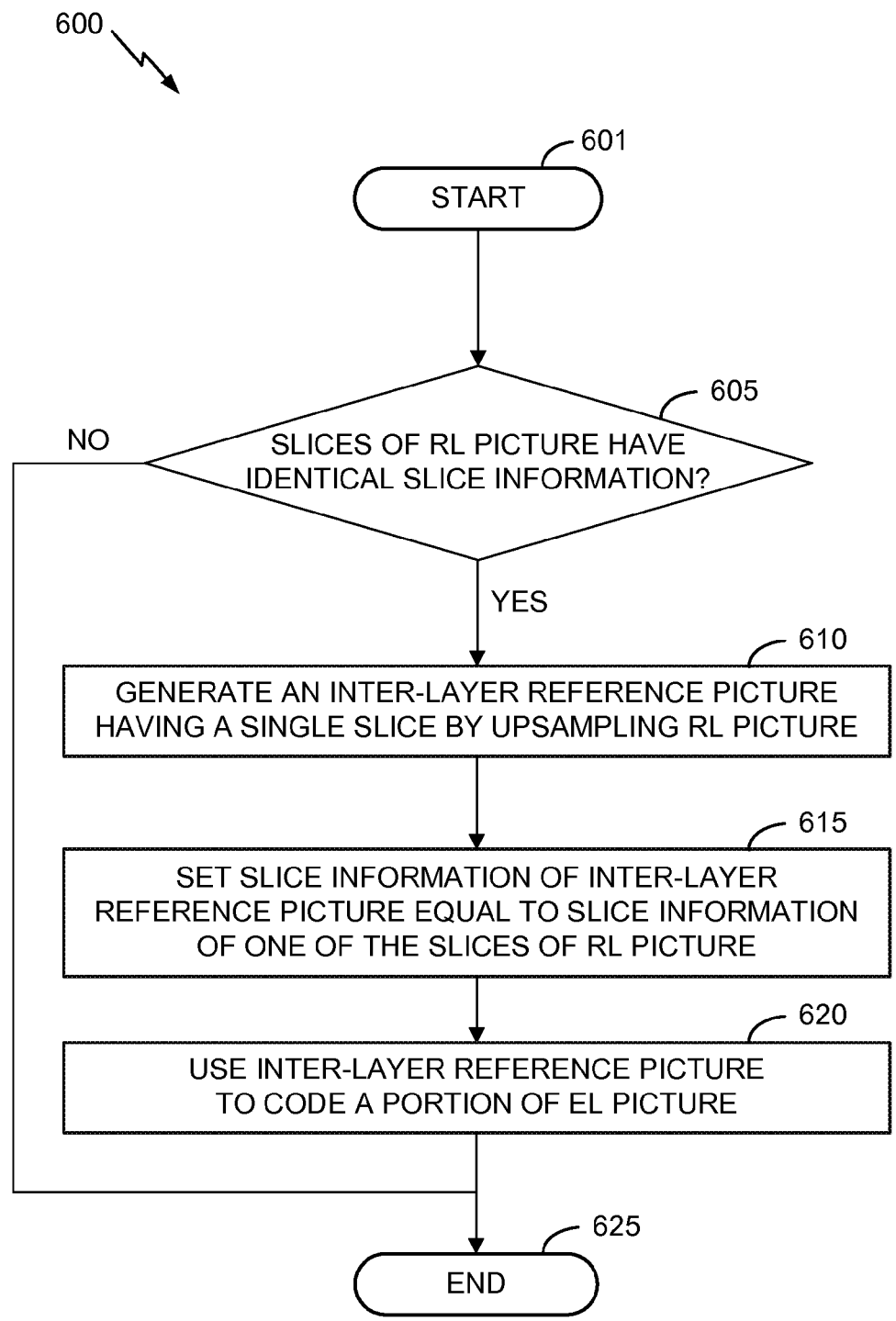
FIG. 6 illustrates a flow chart illustrating a method of coding video information, according to one embodiment of the present disclosure.

FIG. 6 is a flowchart illustrating a method 600 for coding video information, according to another embodiment of the present disclosure. A restriction similar to that of FIG. 5 is applied in the example of FIG. 6, but in this example, inter-layer motion prediction is actually performed by the coder. One or more steps illustrated in FIG. 6 may be performed by an encoder (e.g., the video encoder as shown in FIG. 2A or FIG. 2B), a decoder (e.g., the video decoder as shown in FIG. 3A or FIG. 3B), or any other component. For convenience, method 700 is described as performed by a coder, which may be the encoder, the decoder, or another component.

The method 600 begins at block 601. In block 605, the coder determines whether the slices of the reference layer picture have identical slice information. In one embodiment, the slice information includes the reference picture list associated with the corresponding slice. If the coder determines that the slices of the reference layer picture have identical slice information, the coder generates an inter-layer reference picture having a single slice by upsampling the reference layer picture in block 610. In block 615, the coder sets the slice information of the inter-layer reference picture equal to the slice information of one of the slices of the reference layer picture. For example, the slice information of the first slice of the reference layer picture is copied over to the single slice of the inter-layer reference picture. In block 620, the coder uses the inter-layer reference picture to code (e.g., encode or decode) at least a portion of the enhancement layer picture (e.g., the current picture in the enhancement layer that is being coded). For example, as discussed above, the motion information associated with a block in the inter-layer reference layer (e.g., a resampled version of the reference layer picture) that is co-located with respect to a current block in the enhancement layer may be used a temporal motion vector predictor (TMVP). On the other hand, if the coder determines that the slices of the reference layer picture do not have identical slice information, the method 600 ends at block 620.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether the slices of the reference layer picture have identical slice information, generating an inter-layer reference picture, setting the slice information of the single slice in the resampled reference layer picture equal to one of the slices in the reference layer pictures, and using the generated inter-layer reference picture to code the enhancement layer.

Approach #2: Modification of Slice Information

Alternatively, in one embodiment, in order to prevent the index values from being out of bounds, the reference index values may be clipped to the range of −1 to the maximum reference index value of the reference picture list of the resampled reference layer picture. In one embodiment, the value of −1 indicates that there is no prediction in this particular reference direction (e.g., list 0 or list 1). For example, a uni-predicted block has a motion vector pointing to a single direction, not both. Thus, if there are two reference picture lists, the reference index for one of the two directions can be −1 for uni-predicted blocks.

In another embodiment, after generating the resampled reference layer picture, the reference index values of the blocks that correspond to a slice of the reference layer picture that has a reference picture list that is different from that of the single slice of the resampled reference layer picture are modified such that they identify the correct reference pictures. For example, the reference picture list of slice #1 may be [picture #1, picture #2] and the reference picture list of slice #2 may be [picture #2, picture #1]. In such a case, the reference picture lists of the two slices are different. However, after setting the reference picture list of the single slice of the resampled reference layer picture to, for example, the reference picture list of slice #1, for any blocks corresponding to slice #2 of the reference layer picture, the reference index value of 0 can be changed to 1, and the reference index value of 1 can be changed to 0 to correct the inaccuracy resulting from the single-slice generation.

In yet another embodiment, the change in the reference picture list is addressed by temporally scaling the motion vectors of those blocks such that the motion vectors point to the relevant portions of the new reference picture identified by the reference index values and the new reference picture list. In one example, the motion vectors may be scaled by a factor determined based on the temporal distance between the current picture and the original reference picture and the temporal distance between the current picture and the new reference picture. In another example, the motion vectors may be scaled based on the picture order count (POC) values of the reference pictures.

Figure 7:
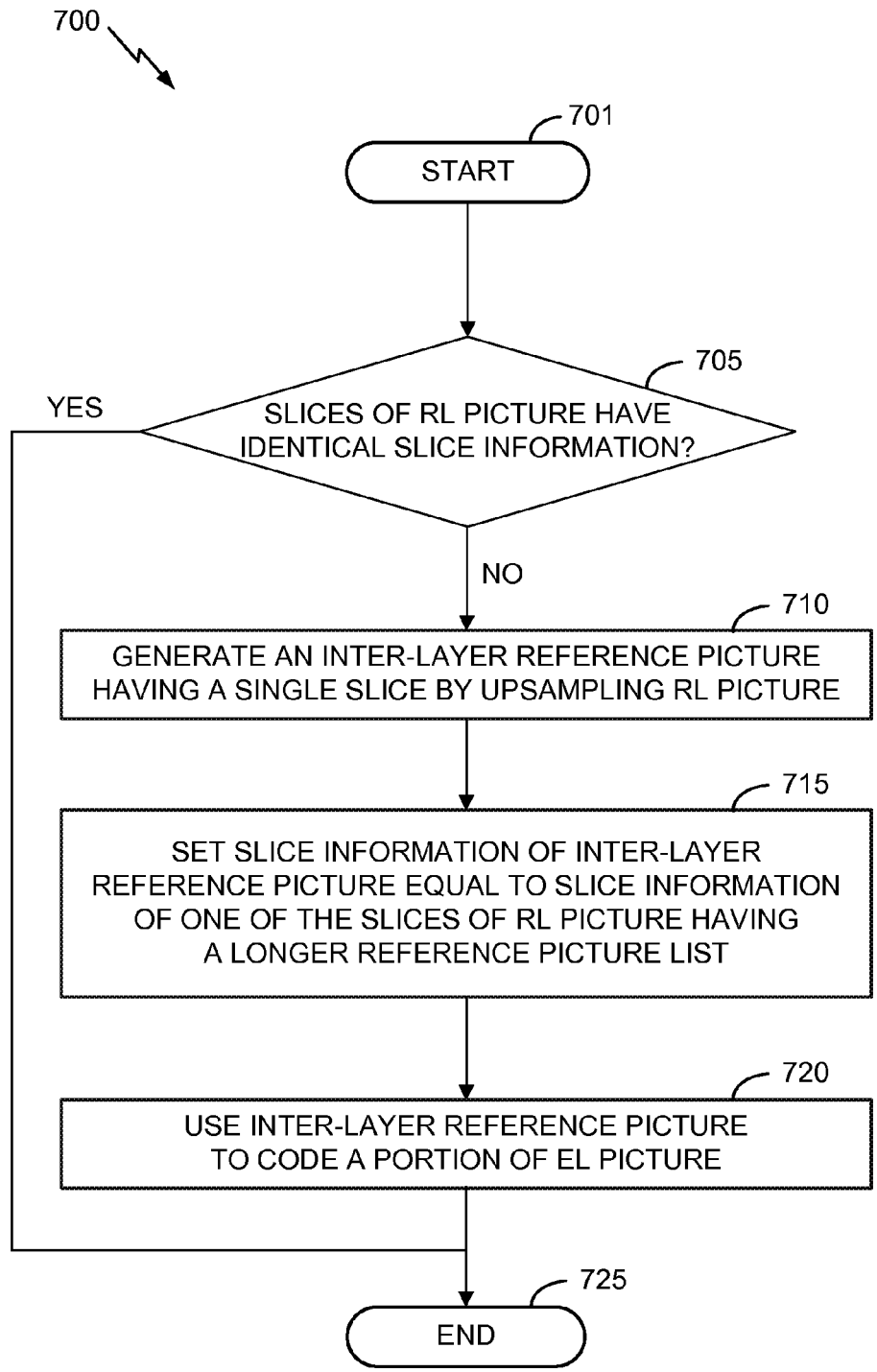
FIG. 7 illustrates a flow chart illustrating a method of coding video information, according to one embodiment of the present disclosure.
Figure 8:
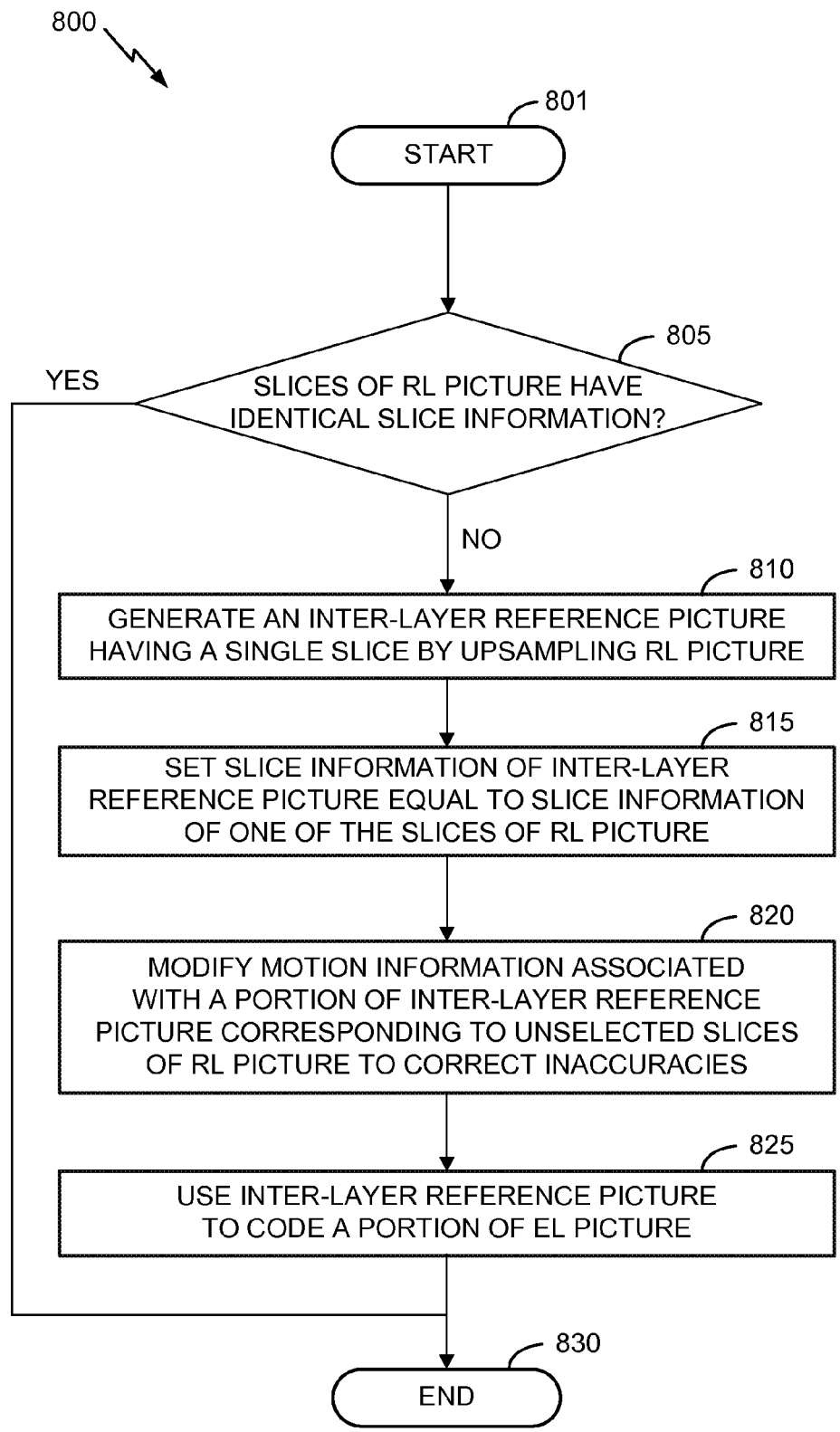
FIG. 8 illustrates a flow chart illustrating a method of coding video information, according to one embodiment of the present disclosure.

With reference to FIGS. 7 and 8, example coding methods that may be performed in the case that the slices of the reference layer picture do not have identical slice information are described. FIG. 7 is a flowchart illustrating a method 700 for coding video information, according to an embodiment of the present disclosure. One or more steps illustrated in FIG. 7 may be performed by an encoder (e.g., the video encoder as shown in FIG. 2A or FIG. 2B), a decoder (e.g., the video decoder as shown in FIG. 3A or FIG. 3B), or any other component. For convenience, method 700 is described as performed by a coder, which may be the encoder, the decoder, or another component.

The method 700 begins at block 701. In block 705, the coder determines whether the slices of the reference layer picture have identical slice information. In one embodiment, the slice information includes the reference picture list associated with the corresponding slice. If the coder determines that the slices of the reference layer picture have identical slice information, the coder generates an inter-layer reference picture having a single slice by upsampling the reference layer picture in block 710. In block 715, the coder sets the slice information of the inter-layer reference picture equal to the slice information of one of the slices of the reference layer picture having the longest reference picture list. For example, the slice information may include the reference picture list information, and the first slice of the reference layer picture is associated with a reference picture list having a length of 5 (e.g., five pictures), and the second slice of the reference layer picture is associated with a reference picture list having a length of 7 (e.g., seven pictures), the slice information of the second slice may be copied over to the single slice of the inter-layer reference picture. In block 720, the coder uses the inter-layer reference picture to code (e.g., encode or decode) at least a portion of the enhancement layer picture (e.g., the current picture in the enhancement layer that is being coded). For example, as discussed above, the motion information associated with a block in the inter-layer reference layer (e.g., a resampled version of the reference layer picture) that is co-located with respect to a current block in the enhancement layer may be used a temporal motion vector predictor (TMVP). On the other hand, if the coder determines that the slices of the reference layer picture do not have identical slice information, the method 700 ends at block 720.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether the slices of the reference layer picture have identical slice information, generating an inter-layer reference picture, setting the slice information of the single slice in the resampled reference layer picture equal to one of the slices in the reference layer pictures having a longer reference picture list, and using the generated inter-layer reference picture to code the enhancement layer.

FIG. 8 is a flowchart illustrating a method 800 for coding video information, according to another embodiment of the present disclosure. While the example of FIG. 7 aims to provide a bitstream constraint conformant inter-layer reference layer, the example of FIG. 8 aims to further improve the coding efficiency resulting therefrom. One or more steps illustrated in FIG. 8 may be performed by an encoder (e.g., the video encoder as shown in FIG. 2A or FIG. 2B), a decoder (e.g., the video decoder as shown in FIG. 3A or FIG. 3B), or any other component. For convenience, method 700 is described as performed by a coder, which may be the encoder, the decoder, or another component.

The method 800 begins at block 801. In block 805, the coder determines whether the slices of the reference layer picture have identical slice information. In one embodiment, the slice information includes the reference picture list associated with the corresponding slice. If the coder determines that the slices of the reference layer picture have identical slice information, the coder generates an inter-layer reference picture having a single slice by upsampling the reference layer picture in block 810. In block 815, the coder sets the slice information of the inter-layer reference picture equal to the slice information of one of the slices of the reference layer picture. For example, the slice information of the first slice of the reference layer picture is copied over to the single slice of the inter-layer reference picture. In block 820, the coder modifies the motion information associated with a portion of the inter-layer reference picture corresponding to unselected slices of the reference picture to correct any inaccuracies therein. For example, in this example, since the slice information of the single slice of the inter-layer reference layer was copied over from the first slice of the reference layer picture, the portion of the inter-layer reference picture that corresponds to any other slice in the reference picture layer may undergo a modification process. As described herein, the modification process may include temporally scaling the motion vectors in such a portion or remapping the reference index such that the reference indices used in such a portion correspond to the correct reference picture in the reference picture list.

By restricting inter-layer motion prediction to those situations in which the slices of the reference layer picture have identical slice information (e.g., slice type, reference picture list, etc.), the generation of single-slice inter-layer reference pictures can be implemented more smoothly and the computational complexity associated with managing multiple slices in inter-layer reference pictures can be reduced or eliminated. The method 800 ends at block 820.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether the slices of the reference layer picture have identical slice information, generating an inter-layer reference picture, setting the slice information of the single slice in the resampled reference layer picture equal to one of the slices in the reference layer pictures having a longer reference picture list, modifying the motion information associated with the inter-layer reference picture, and using the generated inter-layer reference picture to code the enhancement layer.

Slice Level Information Derivation

In one embodiment, all coding tree blocks (CTBs) of the resampled reference layer picture (also referred to as inter-layer reference picture) are associated with the single slice that is generated for the resampled reference layer picture. The slice information of the single slice can be derived from any slice in the corresponding reference layer picture. In one embodiment, the slice type and the reference picture list information of the generated slice is set equal to those of a particular slice in the reference layer picture. For example, the particular slice can be the first slice in the reference layer picture. The following text can be used in SHVC working draft as the detailed implementation of this method:

The slice_type, num_ref_idx_l0_active_minus1 and num_ref_idx_l1_active_minus1 of rsSlice are set equal to the value of slice_type, num_ref_idx_l0_active_minus1 and num_ref_idx_l1_active_minus1 of the first slice of rlPic, respectively. When rsSlice is a P or B slice, for i in the range of 0 to num_ref_idx_l0_active_minus1 of rsSlice, inclusive, reference picture with index i in reference picture list 0 of rsSlice is set equal to reference picture with index i in reference picture list 0 of the first slice of rlPic. When rsSlice is a B slice, for i in the range of 0 to num_ref_idx_l1_active_minus1 of rsSlice, inclusive, reference picture with index i in reference picture list 1 of rsSlice is set equal to reference picture with index i in reference picture list 1 of the first slice of rlPic.

Where, rsPic is the resampled interlayer reference, rsSlice is the slice of rsPic; rlPic is the corresponding reference layer picture.

Alternative Embodiments

In other embodiments, the generation of single-slice inter-layer reference layer may still be performed even if not all slices of the corresponding reference layer picture have identical slice information (e.g., reference picture lists). In such embodiments, the slice type, for example, of the single slice may be derived as follows: (1) if there is at least one B-slice in the corresponding reference layer picture, the slice type of the generated slice of the resampled reference layer picture is set equal to B-slice; (2) if there is no B-slice in the reference layer picture, and if there is at least one P-slice in the corresponding reference layer picture, the slice type of the generated slice of the resampled reference layer picture is set equal to P-slice; and (3) if neither a B-slice nor a P-slice is present in the corresponding reference layer picture, the slice type of the generated slice of the resampled reference layer picture is set equal to I-slice.

Also, in such embodiments, the reference picture list information can be derived as follows: (1) num_ref_idx_l0_active_minus1, which indicates the number of reference pictures in the reference picture list, of the generated slice of the resampled reference layer picture is set equal to that of the slice having the largest value of num_ref_idx_l0_active_minus1 among all slices in the corresponding reference layer picture; reference picture list 0 of the generated slice is set equal to that of the same slice having the largest value of num_ref_idx_l0_active_minus1. For example, the decoded picture buffer may have five pictures, and slice #1 may have two reference pictures in its reference picture list and slice #2 may have four reference pictures in its reference picture list. In that case, num_ref_idx_l0_active_minus1 of slice #2 is greater, so the reference picture list of the single slice generated for the resampled reference layer picture is set equal to the reference picture list of slice #2 of the reference layer picture.

In a case when multiple slices have the same value of num_ref_idx_l0_active_minus1, reference picture list 0 of the generated slice of the resampled reference layer picture is set equal to that of the slice with smallest slice_segment_address among all the slices that have largest value of num_ref_idx_l0_active_minus1; (2) num_ref_idx_l1_ active_minus1 of the generated slice of the resampled reference layer picture is set equal to that of the slice having the largest value of num_ref_idx_l1_active_minus1 among all slices in the corresponding reference layer picture; reference picture list 1 of the generated slice of the resampled reference layer picture is set equal to that of the same slice having the largest value of num_ref_idx_l1_active_minus1. In a case when multiple slices have the same value of num_ref_idx_l1_active_minus1, reference picture list 1 of the generated slice is set equal to that of the slice with smallest slice_segment_address among all the slices that have largest value of num_ref_idx_l1_active_minus1.

Normative Encoder Constraint

As described above, in some implementations, the slice type and the reference picture list of a slice of the inter-layer reference picture are used when deriving a TMVP for a block in the current layer (e.g., enhancement layer). Thus, if the slice types and the reference picture lists of all slices in the corresponding reference layer picture are identical, a single slice may be generated for the resampled reference layer picture and the slice information of the single slice can be derived from any of the slices in the corresponding reference layer because the slice information of those slices are identical.

Accordingly, it may be desirable to have the slice information of the slices in the reference layer picture be identical to each other when deriving a TMVP from the resampled reference layer picture. Thus, in one embodiment, a restriction may be imposed on the collocated_ref_idx syntax element used to identify a co-located picture. For example, when the resampled interlayer reference picture is used as a co-located picture for TMVP derivation, all slices in the corresponding reference layer picture shall have identical slice type, identical reference picture list 0, and identical reference picture list 1. If any of those conditions are not met, the restriction may dictate that such an inter-layer reference picture not be used as a co-located picture for TMVP derivation.

In another embodiment, the restriction may be that for TMVP derivation, all slices in the corresponding reference layer picture shall have identical reference picture list 0 and identical reference picture list 1 (if present). In this example, the slice type may differ among the slices, and the slice type of the single slice of the resampled reference layer picture may be determined as described above. If these conditions are not met, the restriction may dictate that such an inter-layer reference picture not be used as a co-located picture for TMVP derivation.

Signal-to-Noise Ratio (SNR) Scalability

In the case of SNR scalability, the picture format information of the reference layer and the enhancement layer may be identical, and thus the picture resampling process may not be necessary or may not be performed. In such a case, the reconstructed or decoded reference layer picture may be directly used as a reference picture of the enhancement layer. When the CTB sizes of the reference layer picture and the enhancement layer picture are different, and the reference layer picture has multiple slices, the slice partition boundary of the inter-layer reference picture may not coincide with the CTB borders. Thus, a similar problem may arise when the reconstructed or decoded reference layer picture is used as a co-located picture for TMVP derivation. Thus, in some embodiments, the restriction that requires identical slice information among multiple slices of the reference layer picture before inter-layer motion prediction is enabled (or allowed to be performed) is also applied to the case of SNR scalability.

As described above, a restriction may be imposed on the collocated_ref_idx syntax element used to identify the co-located picture, that when the inter-layer reference picture (either resampled or not) is used as a co-located picture for TMVP derivation, all slices in the corresponding reference layer picture shall have identical slice type, identical reference picture list 0 and identical reference picture list 1. If these conditions are not met, the restriction may dictate that such an inter-layer reference picture not be used as a co-located picture for TMVP derivation. In another embodiment, the restriction is applied in the SNR scalability case only when there are multiple slices in the reference layer picture and the slice type or reference picture lists of the multiple slices are not identical, and the CTB sizes of the enhancement layer and the reference layer are different. In yet another embodiment, the restriction is applied in the SNR scalability case only when there are multiple slices in the reference layer picture and the slice type or reference picture lists of the multiple slices are not identical, and the CTB size of the reference layer is smaller than that of the enhancement layer.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
   a memory configured to store video information associated with a reference layer and an enhancement layer, the reference layer comprising a reference layer (RL) picture having a first slice and a second slice, and the enhancement layer comprising an enhancement layer (EL) picture corresponding to the RL picture; and
   a processor in communication with the memory, the processor configured to:
      generate an inter-layer reference picture (ILRP) by upsampling the RL picture, the ILRP having a single slice associated therewith;
      set slice information of the single slice of the ILRP equal to slice information of the first slice; and
      use the ILRP to code at least a portion of the EL picture.

2. The apparatus of claim 1, wherein the EL picture and the RL picture are located in the same access unit.

3. The apparatus of claim 1, wherein the slice information of the single slice comprises a slice type of the single slice and reference picture list information of the single slice.

4. The apparatus of claim 3, wherein reference picture list information comprises:
   a first number of reference pictures in reference picture list 0;
   a first association between the reference pictures in the reference picture list 0 and a first set of reference picture indices; and
   a second number of reference pictures in reference picture list 1;
   a second association between the reference pictures in the reference picture list 1 and a second set of reference picture indices.

5. The apparatus of claim 1, wherein the apparatus comprises an encoder, and wherein the processor is further configured to encode the video information in a video bitstream.

6. The apparatus of claim 1, wherein the apparatus comprises a decoder, and wherein the processor is further configured to decode the video information in a video bitstream.

7. The apparatus of claim 1, wherein the apparatus comprises a device selected from a group consisting one or more of computers, notebooks, laptops, computers, tablet computers, set-top boxes, telephone handsets, smart phones, smart pads, televisions, cameras, display devices, digital media players, video gaming consoles, and in-car computers.

8. A method of coding video information, the method comprising:
   generating an inter-layer reference picture (ILRP) by upsampling a reference layer (RL) picture in a reference layer having a first slice and a second slice, the ILRP having a single slice associated therewith;
   setting slice information of the single slice of the ILRP equal to slice information of the first slice; and
   using the ILRP to code at least a portion of an enhancement layer (EL) picture in an enhancement layer.

9. The method of claim 8, wherein the EL picture and the RL picture are located in the same access unit.

10. The method of claim 8, wherein the slice information of the single slice comprises a slice type of the single slice and reference picture list information of the single slice.

11. The method of claim 10, wherein reference picture list information comprises:
   a first number of reference pictures in reference picture list 0;
   a first association between the reference pictures in the reference picture list 0 and a first set of reference picture indices; and
   a second number of reference pictures in reference picture list 1;
   a second association between the reference pictures in the reference picture list 1 and a second set of reference picture indices.

12. A non-transitory computer readable medium comprising code that, when executed, causes an apparatus to perform a process comprising:
   storing video information associated with a reference layer and an enhancement layer, the reference layer comprising a reference layer (RL) picture having a first slice and a second slice, and the enhancement layer comprising an enhancement layer (EL) picture corresponding to the RL picture;

generating an inter-layer reference picture (ILRP) by upsampling the RL picture, the ILRP having a single slice associated therewith;

setting slice information of the single slice of the ILRP equal to slice information of the first slice; and using the ILRP to code at least a portion of the EL picture.

13. The computer readable medium of claim 12, wherein the EL picture and the RL picture are located in the same access unit.

14. A video coding device configured to code video information, the video coding device comprising:

means for storing video information associated with a reference layer and an enhancement layer, the reference layer comprising a reference layer (RL) picture having a first slice and a second slice, and the enhancement layer comprising an enhancement layer (EL) picture corresponding to the RL picture;

means for generating an inter-layer reference picture (ILRP) by upsampling the RL picture, the ILRP having a single slice associated therewith;

setting slice information of the single slice of the ILRP equal to slice information of the first slice; and means for using the ILRP to code at least a portion of the EL picture.

15. The video coding device of claim 14, wherein the EL picture and the RL picture are located in the same access unit.

* * * * *